(12) United States Patent
Becq et al.

(10) Patent No.: US 8,949,623 B2
(45) Date of Patent: Feb. 3, 2015

(54) SECURITY PROCESSOR AND METHODS FOR REGISTERING ACCESS ENTITLEMENTS AND CRYPTOGRAPHIC KEYS

(75) Inventors: Laurence Becq, Saint Hilarion (FR); Pascal Danois, Saint Cloud (FR); Gilles Dubroeucq, Saint-Piat (FR); Jérôme Perani, Paris (FR)

(73) Assignee: VIACCESS, Paris la Defense Cedex (FR)

( * ) Notice: Subject to any disclaimer, the term of this patent is extended or adjusted under 35 U.S.C. 154(b) by 1873 days.

(21) Appl. No.: 12/097,143

(22) PCT Filed: Dec. 12, 2006

(86) PCT No.: PCT/FR2006/002710
§ 371 (c)(1),
(2), (4) Date: Sep. 24, 2008

(87) PCT Pub. No.: WO2007/068820
PCT Pub. Date: Jun. 21, 2007

(65) Prior Publication Data
US 2009/0222676 A1    Sep. 3, 2009

(30) Foreign Application Priority Data
Dec. 13, 2005  (FR) ...................................... 05 12600

(51) Int. Cl.
*G06F 11/30*    (2006.01)

(52) U.S. Cl.
USPC .......................................................... 713/193

(58) Field of Classification Search
USPC .......................................................... 713/193
See application file for complete search history.

(56) References Cited

U.S. PATENT DOCUMENTS

| | | | |
|---|---|---|---|
| 6,105,134 A * | 8/2000 | Pinder et al. ................... | 713/170 |
| 7,614,079 B2 * | 11/2009 | Bons et al. ....................... | 726/2 |
| 2001/0053226 A1 * | 12/2001 | Akins et al. .................... | 380/282 |
| 2002/0114465 A1 * | 8/2002 | Shen-Orr et al. ............. | 380/231 |
| 2002/0170053 A1 * | 11/2002 | Peterka et al. .................. | 725/31 |
| 2005/0108563 A1 * | 5/2005 | Becker et al. .................. | 713/200 |
| 2005/0198680 A1 | 9/2005 | Baran et al. | |
| 2005/0236475 A1 | 10/2005 | Becker et al. | |
| 2006/0156033 A1 | 7/2006 | Desmicht et al. | |

* cited by examiner

*Primary Examiner* — Esther Benoit
(74) *Attorney, Agent, or Firm* — Douglas E. Jackson; Stites & Harbison PLLC

(57) ABSTRACT

This security method for scrambled multimedia signal decoder comprises at least one rewritable lock (62, 64), the value of which can be toggled at least between a first and a second value in response to an EMM message, and in which a registration module is able, in response to one and the same EMM registration message for writing new access entitlements or new cryptographic keys, to authorize and, alternatively, to prohibit this registration depending on the value of the lock.

15 Claims, 3 Drawing Sheets

SECURITY PROCESSOR AND METHODS FOR REGISTERING ACCESS ENTITLEMENTS AND CRYPTOGRAPHIC KEYS

This invention relates to a security processor and methods for registering access entitlements and cryptographic keys.

In this description the terminology used is that in current use in the field of scrambled multimedia signal transmission systems. For an introduction to this terminology and scrambled multimedia signal transmission systems the reader may consult the following article:

"A single conditional access system for satellite-cable and terrestrial TV", Francoise Coutrot, Vincent Michon, Centre Commun d'Etudes de Télédiffusion et Télécommunication, Cesson-Sévigné, France, IEEE Transactions on Consumer Electronics, Vol. 35, No. 3, August 1989.

In particular the terms "ECM message", "EMM message", "access entitlement" and "access conditions" are used in their normal meaning in this technical field.

There are security processors having:

a decoding module capable of decoding the control word included in an ECM message (Entitlement Control Message) so that scrambled multimedia signals can be unscrambled, a rewritable non-volatile memory containing access entitlements, a comparator able to compare the access conditions present in the ECM message received with the access entitlements placed in memory and to prevent the unscrambling of multimedia signals if the access entitlements do not correspond to the access conditions received and to authorise unscrambling of scrambled multimedia signals if the access entitlements stored in memory correspond to the access conditions received, a module for the registration of new access entitlements in the rewritable non-volatile memory in response to the receipt of an EMM message (Entitlement Management Message) for the registration of new access entitlements.

These security processors typically take the form of smart cards.

For a given decoder there are security processors which operate in different ways. For example there are now security processors which are said to be "disposable", that is they can be used to unscramble multimedia signals for a fixed period $\Delta t$, and then after that period the security processor is discarded because it can no longer be used to unscramble multimedia signals. Period $\Delta t$ is defined by the access entitlements placed in memory in the disposable security processor.

In order to prevent fraud, the access entitlements in a disposable security processor must not be capable of being amended. For this purpose, when the security processor is manufactured the module for the registration of new access entitlements is permanently disabled. For example the program recorded in the disposable security processor's ROM (Read Only Memory) does not include such a registration module.

There are also security processors known as "standard" processors. Unlike disposable security processors these are provided with a module for the registration of new access entitlements. Through this module, access entitlements can be regularly updated. Such a standard security processor is conventionally that used by a subscriber to an operator broadcasting scrambled multimedia signals. In order to achieve this result, when the standard security processor is being manufactured the program recorded in the security processor's ROM memory comprises a fully operational registration module capable of processing EMM messages for the registration of new access entitlements.

Thus the process for the manufacture of standard security processors is not strictly identical to that for disposable security processors because different programs are recorded in the ROM memories of the various standard and disposable security processors.

This makes the manufacture of security processors more complex.

The disadvantage described above is also present in security processors fitted with:

a decoding module capable of decoding the control word included in an ECM message (Entitlement Control Message) so that scrambled multimedia signals can be unscrambled, a rewritable non-volatile memory containing cryptographic keys, a coding and/or decoding module which is capable of coding or decoding messages other than the ECM message received containing the coded control word, a module for the registration of new cryptographic keys in the rewritable non-volatile memory in response to the receipt of an EMM message (Entitlement Management Message) for the registration of new cryptographic keys.

In fact, in one method of operation, here called "disposable" by analogy with the above, the registration of new cryptographic keys must be prevented, whereas in another method of operation, here called "standard" by analogy with the above, the registration of new cryptographic keys should be possible. As in the case of access entitlements, the choice between these two methods of operation is made when the security processor is manufactured, by implementing either a programme provided with a module for the registration of new cryptographic keys or conversely a program which has no such registration module.

The invention aims to overcome this disadvantage by providing security processors which are simpler to manufacture.

The invention therefore relates to a security processor comprising at least one rewritable lock whose value can be toggled between at least a first and a second value in response to an EMM message, and a registration module which is capable of authorising and alternatively prohibiting the registration of new access entitlements depending upon the value of the lock in response to the same EMM message for the registration of new access entitlements.

The invention also relates to a security processor comprising at least one rewritable lock whose value can be toggled between at least a first and a second value in response to an EMM message, and a registration module which is capable of authorising and alternatively prohibiting the registration of new cryptographic keys, depending upon the value of the lock, in response to an EMM message for the registration of a new cryptographic key.

In the above security processors, by adjusting the lock value the same security processor can be configured to operate either as a disposable security processor or as a standard security processor, for example. Furthermore, as the lock value can be amended through an EMM message, this configuration no longer needs to be provided during the stage of manufacturing the security processor. For example, a security processor can be configured as a disposable security processor or as a standard security processor during a stage of personalising the security processor, or even during a stage when the security processor is used in a subscriber's decoder.

Hence the manufacture of a security processor which is intended to operate as a standard security processor is identical to that of a security processor intended to operate as a disposable security processor. This simplifies the manufacture of the security processors.

It also makes it possible to offer new methods of operation. For example it is conceivable that a security processor operating as a disposable security processor could be marketed and then if the user of that security processor took out a subscription to convert the operation of that security processor so that it then operated as a standard security processor.

The manner in which security processors are manufactured could comprise one or more of the following features:

the processor comprises a write module capable of toggling the lock value from the first value to the second value in response to an EMM message and to prevent toggling of the lock value from the second value to the first value whatever subsequent EMM messages are received, the processor comprises a write module capable of toggling the lock value from the first value to the second value in response to an EMM message only if the current date present in the EMM message is earlier than a limiting activation date registered in the security processor, the processor comprises a security self-destruct module in such a way as to render it permanently unusable with all available decoders and in which a unit for the processing of ECM or EMM messages can compare the current date present in an ECM or EMM message received on an absolute expiry date placed in memory in the security processor and automatically activate the self-destruct module only if the present date is subsequent to the absolute expiry date.

The methods of manufacturing security processors also have the following advantages:

use of a lock write module to prevent toggling of the value of that lock regardless of the EMM message received renders amendment of the operation of the registration module irreversible, use of a write module for the lock value authorising amendment of that value taking into account the limiting activation date renders amendment of the operation of the registration module impossible after the limiting activation date, use of the present date included in an ECM or EMM message received to activate destruction of the security processor makes it possible to avoid having to resort to the sending of a specific instruction for initiating destruction of the security processor.

The invention also relates to a process for the registration of access entitlements in the above security processors, this process comprising a stage of authorising and alternatively a stage of prohibiting such registration of new access entitlements depending upon the value of the lock.

The invention also relates to a process for the registration of cryptographic keys in the security processor, this process comprising a stage of authorising and alternatively a stage of prohibiting such registration of new cryptographic keys depending upon the value of the lock.

The invention will be better understood from a reading of the following description provided purely by way of a non-limiting example with reference to the drawings, in which:

FIG. 1 shows a system 2 for the transmission of scrambled multimedia signals. The multimedia signals are, for example, audiovisual signals corresponding to television channel audiovisual programmes.

In the rest of this description features and functions which are well known to those skilled in the art will not be described in detail.

System 2 comprises a transmitter 4 for multimedia signals scrambled using a control word CW intended for a large number of receivers, through an information transmission system 6.

Figure 1:
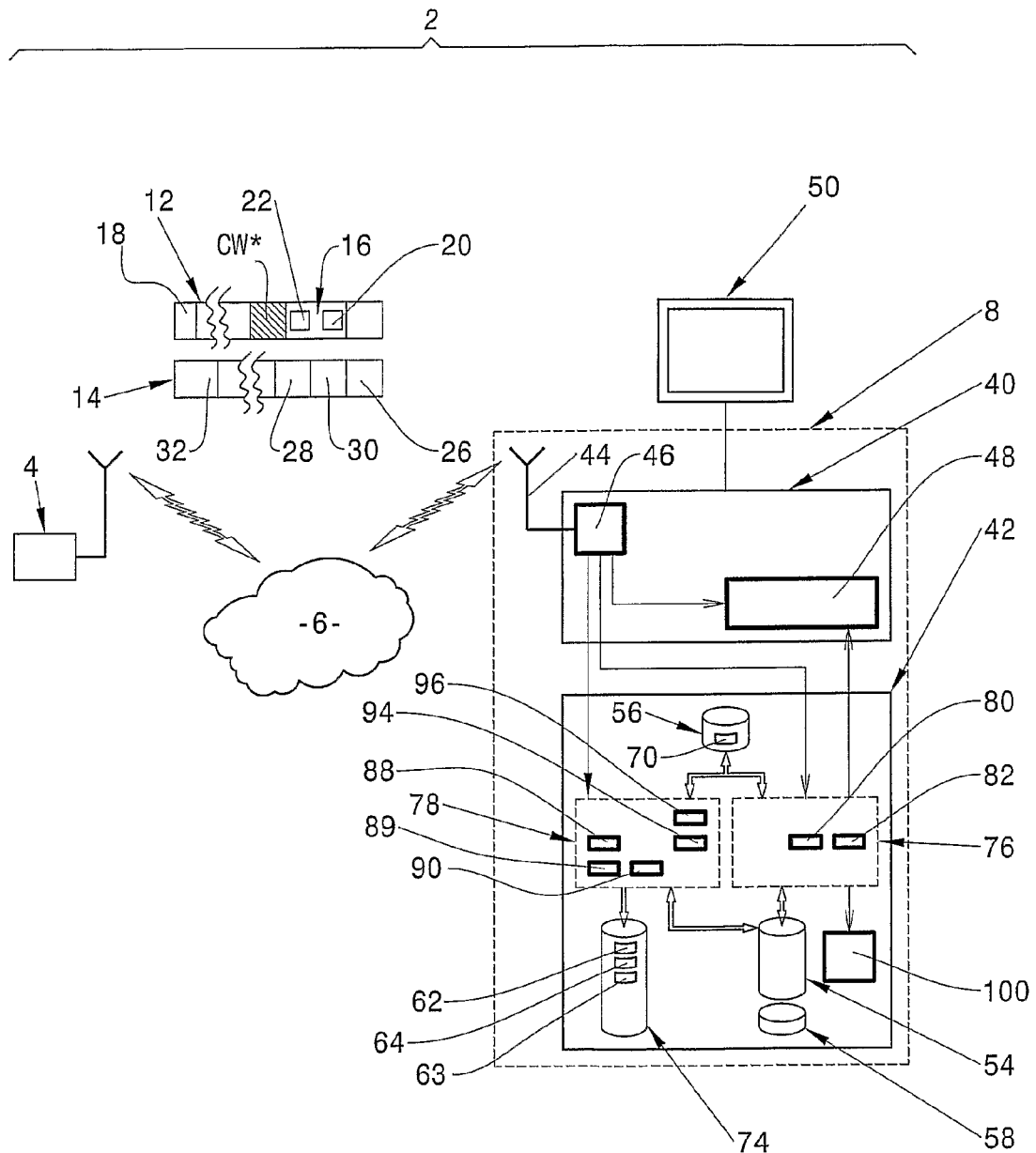
FIG. 1 is a diagrammatical illustration of the architecture of a system for the transmission of scrambled multimedia signals.

To simplify FIG. 1, only one receiver 8 is shown.

System 6 is, for example, a hertzien system such as illustrated here or a long distance cable system.

Transmitter 4 can send ECM messages and EMM messages simultaneously with scrambled multimedia signals.

FIG. 1 shows an example of part of the structure of an ECM message 12 and an EMM message 14.

Here each ECM message comprises:

a cryptogram CW* of the control word CW used to scramble the multimedia signals, access conditions 16 for the scrambled multimedia signals, and means 18 for authenticating the ECM message.

Access conditions 16 include for example an identifier 20 of the content of the multimedia signals scrambled with the control word CW, and a field 22 containing the current date. This current date is generated by transmitter 4.

Means 18 comprises for example a cryptographic signature or a cryptographic redundancy produced by transmitter 4.

Each EMM message further comprises:

an identifier 26 for a security processor or a group of security processors for which the EMM message is intended, a field 28 containing the current date generated by transmitter 4, a field 30 containing instructions for updating cryptographic keys and/or access entitlements, and means 32 for authenticating the EMM message.

Means 32 is, for example, identical to means 18.

In the special case of an EMM message for the registration of new access entitlements, field 30 includes instructions for amending the access entitlements already registered in a security processor or for adding new access entitlements.

In the case of an EMM message for the registration of new cryptographic keys, field 30 includes instructions through which cryptographic keys already registered in the security processor can be amended, or new ones can be added.

Receiver 8 is able to receive scrambled multimedia signals as well as ECM and EMM messages. For this purpose receiver 8 comprises a decoder 40 associated with a security processor 42. Processor 42 is typically a removable processor such as a smart card which can be inserted into decoder 40. Processor 42 communicates with decoder 40 through a processor/decoder interface. Typically the interface comprises electrical connectors, each connector having a male and a female member, each forming an integral part of either the decoder or the processor. The interface between decoder 40 and processor 42 complies for example with standard ISO 7816.

Decoder 40 is here fitted with an antenna 44 for receiving the various signals broadcast by transmitter 4. This antenna 44 is connected to a block 46 for demultiplexing the signals and, if appropriate, filtering the signals. At the output from this block 46 scrambled multimedia signals are passed to an unscrambler 48. The EMM and ECM messages are passed to processor 42.

Unscrambler 48 can unscramble multimedia signals which have been scrambled using the control word CW decoded by processor 42.

Decoder 40 is connected to a device 50 which displays unscrambled multimedia signals such as, for example a television set.

Processor 42 is provided with:
- a non-volatile rewritable memory 54 in which access entitlements are registered,
- a non-volatile rewritable memory 56 in which cryptographic keys are registered,
- a ROM memory (Read Only Memory) 58 intended to contain the various program instructions executed by processor 42, and
- three rewritable locks 62 to 64.

Examples of access entitlements present in memory 54 will be provided with reference to the description of FIG. 2.

To simplify FIG. 1, only one cryptographic key, here referred to as the operating key 70, is illustrated as being registered in memory 56. Operating key 70 is intended to decode the control word CW as received in the ECM message before it is transmitted to unscrambler 48.

Locks 62 to 64 are for example predetermined zones in a non-volatile rewritable memory 74.

Locks 62 to 64 each place one value in memory. Here the value of each of these locks can only be toggled between a first value, in this case zero, and a second value, in this case unity, in response to receiving an EMM message for explicitly writing the corresponding lot or as a consequence of the processing of an EMM message. Locks 62 to 64 exist independently of the access entitlements and the cryptographic keys which already have been or will be registered in the memories of the security processor.

When the value of lock 62 is equal to unity, this means that processor 42 operates as a disposable security processor, that is to say no new access entitlement can be registered in memory 54 and no new cryptographic key can be registered in memory 56. Furthermore, among all the possible functions of an EMM message, processor 42 is only able to process a small number of the functions of this EMM message, such as the invalidation or deletion of data or the management of a confidential user code.

When the value of lock 63 is equal to unity this means that a stage of personalisation of the security processor has been completed. The personalisation stage is described in greater detail with reference to FIG. 2. When the value of this lock 63 is equal to zero, this means that the security processor has not yet been personalised.

When the value of lock 64 is equal to zero, this means that processor 42 operates as a standard security processor, that is to say it is possible to register new access entitlements in memory 54 and that it is also possible to register new cryptographic keys in memory 56.

When the value of lock 64 is equal to unity, this means that processor 42 operates like a security processor which is referred to as being "activatable". An activatable security processor initially operates in the same way as a disposable security processor. Among all the possible functions of an EMM message, processor 42 is only able to process a small number of the functions of an EMM message. However, unlike a disposable security processor, this security processor cannot be converted into a standard security processor in response to an EMM message.

Processor 42 also comprises a unit 76 for the processing of ECM messages received and a unit 78 for the processing of EMM messages received.

Unit 76 also comprises:
- a comparator 80 for comparing the access conditions present in the ECM message received with the access entitlements placed in memory in memory 54 in order to determine whether unscrambling of the multimedia signals should be authorised or conversely inhibited,
- a module 82 for decoding the cryptogram CW* in order to obtain control word CW using operating key 70.

Unit 76 is connected to memories 54, 56 and 74.

Unit 78 comprises in particular:
- a module 88 for writing to lock 62,
- a module 89 for writing to lock 64,
- a module 90 for writing to lock 63,
- a module 94 for the registration of new access entitlements in memory 54 in response to the receipt of an EMM message for a registration of new access entitlements, and
- a module 96 for the registration of new cryptographic keys in memory 56 in response to the receipt of an EMM message for the registration of new cryptographic keys.

Unit 78 is connected to memories 54, 56 and 74.

Finally, processor 42 comprises a module 100 for the self-destruction of processor 42. This module 100 is capable of rendering processor 42 permanently unusable. For this purpose, for example, module 100 can delete the contents of all the rewritable memories and in particular delete the data which enable processor 42 to operate. Module 100 may also make use of an internal function in processor 42 which makes it possible to change or delete the primary cryptographic key which is used to decode the executable code recorded in memory 58.

Typically units 76 and 78 are constructed using a programmable electronic calculator capable of executing program instructions recorded in ROM memory 58. For this purpose memory 58 in particular includes instructions for executing the process in FIGS. 2A and 2B when these instructions are executed by the programmable calculator.

The operation of receiver 8 will now be described with the help of FIGS. 2A and 2B in the particular case of processor 42 and decoder 40.

Initially, in the course of a stage 120, processor 42 is manufactured. In the course of this stage 120 the instructions necessary for execution of this process are registered in memory 58. The default value of locks 62 to 64 is zero. Memories 54 and 56 are clean.

Once manufactured, processor 42 is personalised during the stage 122, by a reliable authority. This stage 122 essentially comprises registering the information required for marketing it and its operation in a decoder in the various rewritable memories of processor 42.

For example, here in the course of stage 122, in a stage 124, a sliding right is recorded as an access entitlement in memory 54. A sliding right is an access entitlement of the subscription type, permitting access to particular programmes during a particular period for which it is valid. Unlike a standard subscription right, referred to as a fixed right, a sliding right does not include a validity period specified by an explicit start date and an explicit end date (or duration). Conversely, when the first access condition which can be satisfied by the sliding right is processed by processor 42, the latter is automatically converted by processor 42 into a fixed right whose validity period has the date of receipt of this first access condition as the start date and a calculated date DFDF (End Date for the Fixed Right) for the end date, which is equal to the date of receipt increased by a number NBDAY (or for a period NBDAY). The sliding right is characterised by the following information:

the number NBDAY of days defining a period during which processor 42 may be used to unscramble multimedia signals from the operator of transmitter 4, an identifier for the audiovisual programmes or group of audiovisual programmes which can be unscrambled by that sliding right, a date DPDG (Expiry Date for the Sliding Right) beyond which processor 42 cannot anymore convert the sliding right into a fixed right.

If appropriate, in the situation where processor 42 is configured to operate as an activatable security processor, a period DA (Activation Period) is registered in memory 54. This period DA defines the period during which processor 42 can be activated in order to pass from an operating mode in which it operates as a disposable security processor to a new operating mode in which the processor operates as a standard security processor. More specifically, when the sliding right is converted into a fixed right, the processor calculates a date DLA (Limiting Activation Date) equal to date DFDF incremented by period DA. As long as this calculation has not been performed, date DLA has a default value corresponding to a very old date such as Jan. 1, 1900 in order to prohibit activation.

In a stage 124 an operating key is also registered in memory 56. This operating key is for example known by all the decoders from the same operator.

Then in a stage 126 parameters specific to the operator of transmitter 4 are registered in the rewritable memories. In particular one of the parameters is the date DPA (Absolute Expiry Date) after which processor 42 should destroy itself.

During the next stage 128 EMM messages writing locks 62 and 64 are sent to processor 42 to toggle, if necessary, the values of locks 62 and 64. Typically, in stage 128, these write messages are processed by write modules 88 and 89. Here these EMM write messages sent during the personalisation stage make it possible to configure processor 42 so that it operates as a disposable security processor (value of lock 62 equal to unity) or as an activatable security processor (value of lock 62 equal to zero and value of lock 64 equal to unity) or again as a standard security processor (value of lock 62 equal to zero and value of lock 64 equal to zero). The combination of the two locks 62 and 64 being equal to unity is furthermore prohibited, because by definition a disposable processor cannot be activated.

Once the values of locks 62 and 64 have been placed in memory then in a stage 130 an EMM message writing lock 63 is sent to processor 42. This message is then processed by write module 90 so that the value of "unity" is stored in memory in lock 63, indicating that processor 42 has been personalised.

From then on, whatever subsequent EMM messages are received, the values of locks 62 and 63 can no longer be changed. For this purpose, for example, modules 88 and 90 enable writing in locks 62 and 63 only if the value of lock 63 is other than unity, that is to say if processor 42 has not been personalised.

Also from that time the value of lock 64 can only be toggled to the value zero. For example, to prevent the value of this lock being toggled to the value of unity module 89 checks the value of lock 63 before performing such a writing operation and prohibits the value of "unity" being written in that lock if the value of lock 63 is equal to unity, that is to say if processor 42 has been personalised.

Once stage 122 is complete, personalised processor 42 is temporarily stored with an operator or with a distributor prior to being attributed to a subscriber. Then a stage 136 of using processor 42 in decoder 40 begins.

More specifically, in a stage 140 processor 42 is inserted in decoder 40.

Unit 76 then executes a procedure 142 processing ECM messages and in parallel unit 78 executes a procedure 144 processing EMM messages for the registration of new access entitlements and/or new cryptographic keys as well as a procedure 145 of processing other EMM messages.

In procedure 142, in a stage 146, unit 78 receives an ECM message.

Then in the course of a stage 148 unit 76 checks whether the current date 22 is equal to or later than date DPA. If this is the case, self-destruct module 100 is activated in a stage 150. Thus in stage 150 processor 42 is rendered permanently unusable in any decoder into which it might be inserted.

If the current date present in the ECM message processed is still not yet later than date DPA, unit 76 checks in a stage 152 whether the access conditions 16 associated with identifier 20 can be satisfied by the sliding right registered in memory 54 of processor 42. If this is the case unit 76 proceeds to a stage 154 in which it checks that the current date 22 present in the ECM message processed is earlier than the date DPDG of the sliding right registered in memory 54 during the personalisation stage.

If the current date of the ECM message processed is earlier than date DPDG, then in a stage 156 the sliding right is converted into a fixed right whose start date is the current date 22, and whose end date DFDF (end date for fixed rights) is calculated by adding to the current date the number of days NBDAY registered in memory 54 in stage 122, and for which the program identifier is the identifier registered in memory 54 during stage 122. After its conversion into a fixed right, the sliding right ceases to exist in memory 54.

Furthermore, if the values of locks 62 and 64 are equal to zero and one respectively, that is to say it is an activatable processor, then unit 76 also calculates the DLA date (limiting activation date) and registers it in memory 54.

Then, in a stage 158, unit 76 determines whether the current date 22 in the ECM message is later than date DFDF. If this is the case, unscrambling of the multimedia signals is inhibited in a stage 164. For example, in stage 164 module 82 is disabled so that the cryptogram CW* is not decoded, which makes it impossible to unscramble multimedia signals.

If this is not the case, unit 76 authorises unscrambling of the multimedia signals in a stage 160. More specifically, in stage 160 module 82 decodes cryptogram CW* using operating key 70 to obtain the control word CW which it transmits to unscrambler 48. In order to unscramble the scrambled multimedia signals unscrambler 48 unscrambles the scrambled multimedia signals using control word CW before transmitting them to device 50 for normal display.

If in the course of stage 152 unit 76 establishes that the access conditions present in the ECM message received are not satisfactory for the sliding right (for example because there is no longer any sliding right in memory 54), then unit 76 proceeds to a stage 162 in which it checks whether the access conditions can be satisfied by another right registered in memory 54.

If this is the case, unit 76 authorises unscrambling of the multimedia signals, and proceeds to stage 160 described above.

If this is not the case, unscrambling of the scrambled multimedia signals is inhibited, and it proceeds to stage 164 described below.

On completion of stage 160 or stage 164 the process returns to stage 146 to receive and process the next ECM message.

In parallel, at the start of procedure 144, during a stage 176, unit 78 receives an EMM message for the registration of new access entitlements. Then during a stage 178 unit 78 checks whether the current date 28 is equal to or later than date DPA. If this is the case, self-destruct module 100 is activated in a stage 180. Thus during stage 180 processor 42 is rendered permanently unusable in any decoder into which it can be inserted.

If the current date present in the EMM message processed is not later than date DPA, module 94 then checks in stage 182 whether processor 42 should operate as a disposable security processor. In order to do this module 94 checks whether the value of lock 62 is equal to unity in a stage 182. If this is the case, module 94 prevents the writing of new access entitlements in a stage 184. For example, in stage 184 the EMM message received is not processed, so that no new access entitlement is registered in memory 54.

If this is not the case, then during a stage 186 module 94 tests whether the value of lock 64 is equal to zero. If this is the case it means that processor 42 should operate as a standard security processor and in a stage 188 module 94 authorises the registration of new access entitlements. Typically, in stage 188 module 94 registers the new access entitlements included in the EMM message received in memory 54.

In the case where the value of lock 64 is equal to unity, on completion of stage 186 module 89 checks in a stage 190 that the current date present in the EMM message received is earlier than the date DLA. If this is the case module 89 toggles the value of lock 64 from the value of unity to the value of zero in a stage 192, which means that processor 42 will henceforth operate as a standard processor.

On completion of stage 192, procedure 144 continues with the execution of stage 188.

If in the course of stage 190 module 89 establishes that the EMM message for the registration of new rights has been received after date DLA, then it proceeds to stage 184 and the EMM message received is not processed, so that no new access entitlement is registered in memory 54.

Thus, through the above process for the registration of rights during the personalisation stage processor 42 can be personalised as being a disposable security processor. In this operating mode processor 42 must be inserted into a decoder prior to date DPDG. Then, once inserted in the decoder, processor 42 makes it possible to unscramble the scrambled multimedia signals only during the period NBDAY. At the end of this period processor 42 cannot be converted into a standard security processor and cannot therefore further be used.

During personalisation stage 122 processor 42 can also be personalised to operate as an activatable security processor. In this situation, after being first inserted in decoder 40 prior to date DPDG processor 42 operates like a disposable processor. However, unlike a disposable security processor, it can be converted into a standard security processor prior to date DLA by toggling the value of lock 64 to the value zero.

Finally, processor 42 can also be configured in the course of stage 122 to operate as a standard security processor as soon as it comes into service, when new access entitlements can be freely registered.

Figure 2A:
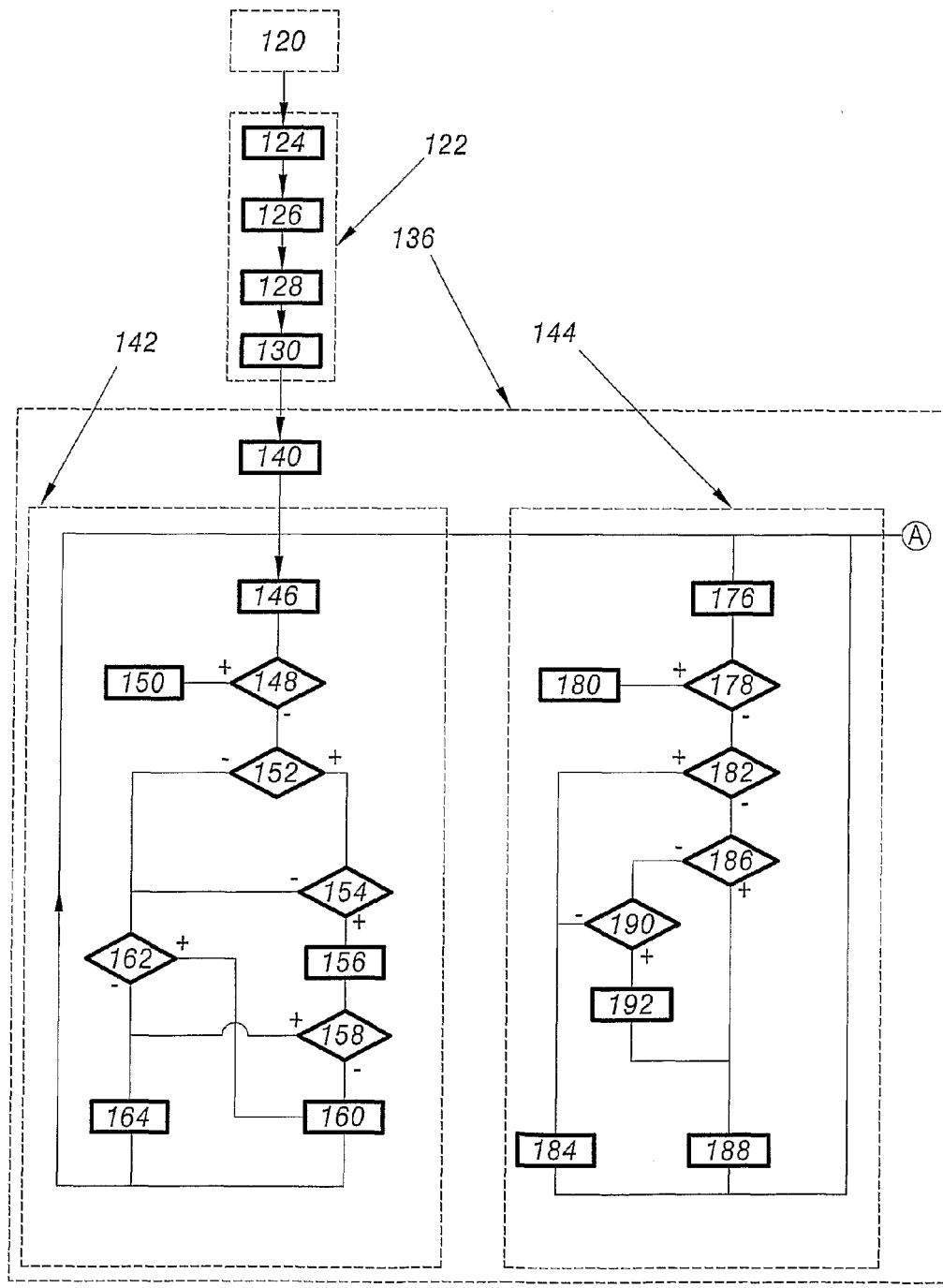
FIGS. 2A and 2B are a flow chart for a process for the registration of access entitlements and/or cryptographic keys in a security processor of the system in FIG. 1.

The procedure in FIG. 2A also applies to the processing of a key registration EMM. In this case:

during stage 176 processor 42 receives a key registration EMM, in stage 188 processor 42 proceeds to register the new value of operating key 70 in memory 56 in stage 184 processor 42 performs no key registration module 94 is replaced by module 96.

Processor 42 executes procedure 145 to process an EMM other than an access entitlement or key registration EMM.

At the start of procedure 145, during a stage 294, unit 78 receives this EMM message which is neither a message for the registration of new access entitlements nor a message for the registration of cryptographic keys. Then in a stage 296 it checks that the current date present in this EMM message is earlier than date DPA. If this is not the case unit 78 activates self-destruct module 100 in a stage 298. This stage 298 is, for example, identical to stage 180.

If it is the case, then during the stage 302 unit 78 checks whether the security processor is a disposable processor. During this stage 302 unit 78 therefore checks that the value of lock 62 is equal to unity.

If processor 42 is not a disposable processor, then in a stage 304 unit 78 checks whether processor 42 is an activatable processor. Unit 78 therefore checks whether the value of lock 64 is equal to unity in the course of stage 304.

If this is the case, unit 78 proceeds to a stage 306 during which it checks that the current date present in the EMM message processed is earlier than date DLA. If this is the case the activatable processor is converted into a standard processor in a stage 308. More specifically, in stage 308 module 89 causes the value of lock 64 to toggle from the value of unity to the value of zero. This stage 308 is, for example, identical to stage 192.

On completion of stage 308, the EMM message received is processed in a stage 310.

If during stage 302 it is established that the processor is a disposable processor, then unit 78 proceeds to a stage 312 in the course of which unit 78 checks whether the processing requested in the EMM message is one of the processing operations authorised for a disposable security processor. If this is the case, unit 78 then proceeds to stage 310. If not, the EMM message received is not processed and the procedure returns to stage 294.

If during stage 304 unit 78 establishes that the processor is not an activatable processor, that is to say it is therefore a standard security processor, unit 78 then proceeds directly to stage 310.

If in the course of stage 306 unit 78 establishes that the current date in the EMM message received is later than date DLA, it then proceeds to a stage 314 in which it determines whether the processing operation requested in the EMM message received is one of the processing operations authorised for an activatable security processor. If this is the case unit 78 then proceeds to stage 310. If not, unit 78 returns to stage 194 without processing the EMM message received.

Once stage 310 is complete, procedure 145 returns to stage 294 to receive and process another EMM message.

Many other embodiments are possible. In particular the description above has been provided in the special case where the locks are used to configure processor 42, either to operate as a disposable security processor, or as an activatable security processor, or as a standard security processor. Other modes of operation may be defined, and these may result in the addition or the elimination of locks such as locks 62 and 64.

Procedure 144 can be modified so that it processes only EMM messages for the registration of new access entitlements or only EMM messages for the registration of new keys. In this case the EMM messages which are no longer processed by procedure 144 are processed by procedure 145. This makes it possible to simplify the architecture of processor 42. For example, module 96 or module 94 may be omitted as appropriate.

Figure 2B:
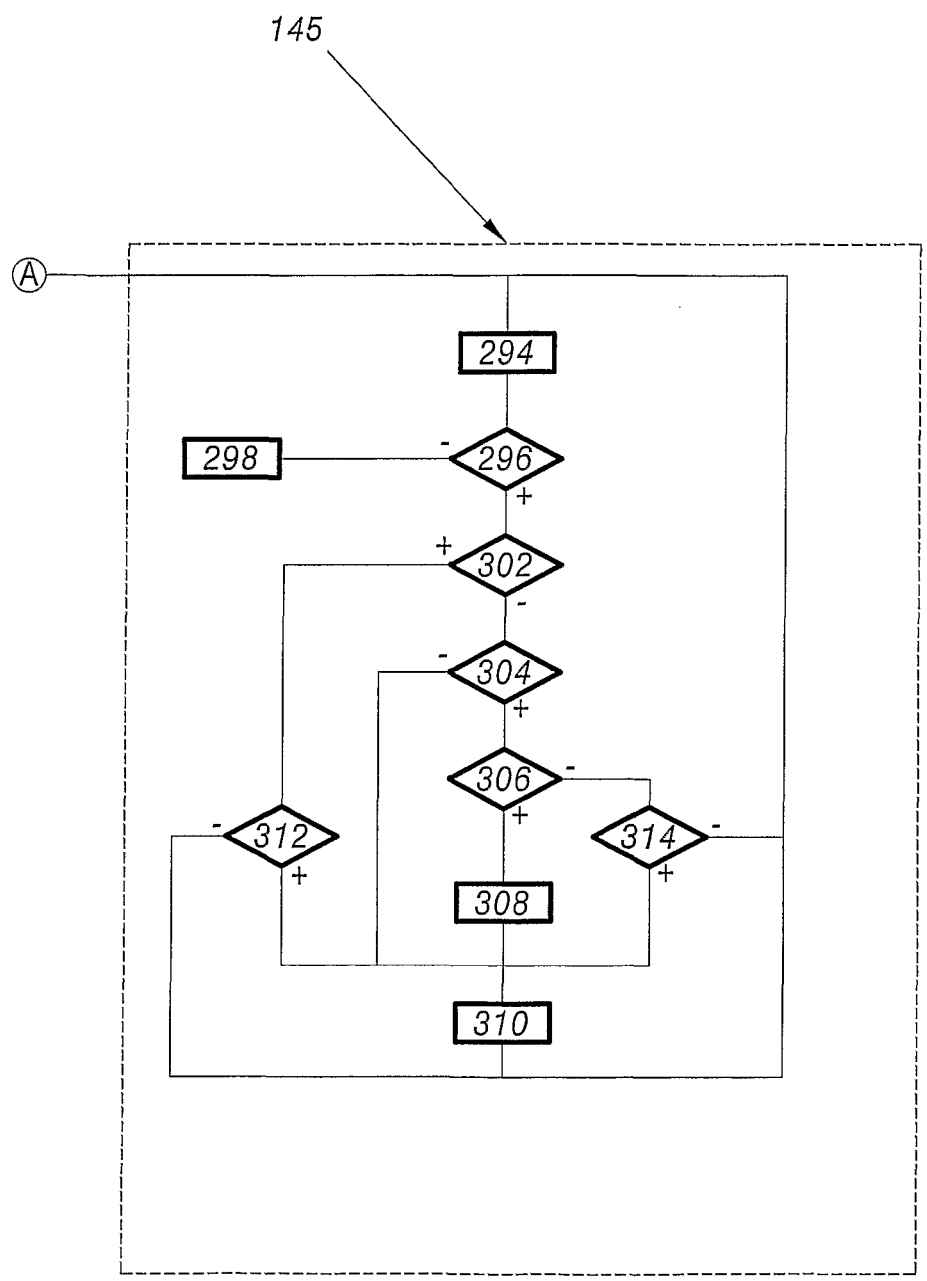

Here, processor 42 and the procedure in FIGS. 2A and 2B have been described in the special case in which the EMM message which makes it possible to toggle the value of lock

64 to the value zero is the first EMM message addressed to and received by processor 42, regardless of its function.

In a variant, only particular types of EMM messages such as an EMM message for the registration of access entitlements or the registration of cryptographic keys make it possible to activate processor 42. Stage 306 in FIG. 2B then also includes a check that the type of EMM message can give rise to activation of processor 42. This for example makes it possible to prevent activating processor 42 when the operator sends it an EMM message for reinitialising a confidential user code.

In another variant, transmitter 4 sends processor 42 a specific activation EMM message in response to which module 89 toggles the value of lock 64 to the value zero. This specific activation EMM message does not include any new access entitlement or any new cryptographic key and, for example only, makes it possible to configure process 42 so that this operates as a standard security processor. From then on, from the moment when the value of lock 64 is toggled to the value zero, new access entitlements or keys can be registered in memory 54 in a manner similar to that described in the special case where in stage 122 processor 42 is directly configured to operate as a standard security processor.

Furthermore, regardless of the means of activation such as that above, activation may include the additional condition that the sliding right should have reached the end of its validity. In this case, in stages 190 and 306 unit 78 not only checks that the current date present in the EMM message is earlier than the activation limiting date DLA but also that the current date is later than the date DFDF for the end of the fixed right arising from the sliding right, if present.

In the example described above, during personalisation stage 122 different data such as the sliding right or the initial values of locks 62 to 64 are registered in processor 42 using EMM messages. The structure of these EMM messages, in particular during the personalisation stage, may differ from that described here by way of example. In particular, as a variant, the EMM messages used during the personalisation stage may include low level instructions which are directly executable by processor 42. However, whatever the structure of the EMM message used to alter the value of the locks, the latter is always received through the processor/decoder interface.

In the example described above the self-destruct condition of processor 42 through comparing date 22, 28 present in the message processed with date DPA is checked for ECM messages and EMM messages. As a variant, this self-destruct condition may be limited to ECM messages only, that is to say only when processor 42 is used to effectively access a content. This makes it possible to simplify the program of processor 42.

In another variant the self-destruct condition may be extended to comparison of the date present in the ECM or EMM message and date DLA, when present, self-destruction being initiated if date DLA up to which processor 42 can be activated has been passed.

The invention claimed is:

1. A security processor for a decoder of multimedia signals scrambled using a control word and which is configurable to have an operating mode as either a disposable or standard security processor, the processor comprising:
   a decoder capable of decoding the control word present in an ECM message (Entitlement Control Message) to allow the scrambled multimedia signals to be unscrambled,
   a rewritable non-volatile memory containing access entitlements,
   a comparator capable of comparing the access conditions present in the ECM message received with the access entitlements placed in the rewritable non-volatile memory and to prevent unscrambling of the multimedia signals if the access entitlements do not correspond to the access conditions received and to authorize unscrambling of the scrambled multimedia signals if the access entitlements in the rewritable non-volatile memory correspond to the access conditions received,
   a register for the registration of new access entitlements in the rewritable non-volatile memory in response to the receipt of an EMM message (Entitlement Management Message) for the registration of new access entitlements, and at least one rewritable lock whose value can be toggled between at least a first and a second value in response to an EMM message, and
   wherein the register is able to authorise and alternatively prohibit this registration of new access entitlements, depending upon the value of the rewritable lock, and
   in response to a given EMM message for the registration of new access entitlements, configuring an operating mode of the security processor as one of: a disposable security processor or a standard security processor.

2. A security processor according to claim 1, in which the register is able to authorise and alternatively prohibit the registration of a new access entitlement depending upon the value of the rewritable lock, without preventing the use of other access entitlements already registered in the rewritable non-volatile memory in response to a given EMM message for the registration of a new access entitlement.

3. A security processor for a decoder of multimedia signals scrambled using a control word and which is configurable to have an operating mode as either a disposable or standard security processor, this processor comprising:
   a decoder capable of decoding the control word present in an ECM message (Entitlement Control Message) to enable scrambled multimedia signals to be unscrambled,
   a rewritable non-volatile memory containing cryptographic keys, a register for the registration of new cryptographic keys in the rewritable non-volatile memory in response to the receipt of an EMM message (Entitlement Management Message) for the registration of new cryptographic keys, and
   at least one rewritable lock whose value can be toggled between at least a first and a second value in response to an EMM message, and
   wherein the register is capable of authorizing and alternatively prohibiting such registration of new cryptographic keys depending upon the value of the rewritable lock, and
   in response to an EMM message for the registration of a new cryptographic key, configuring an operating mode of the security processor as one of: a disposable security processor or a standard security processor.

4. A security processor according to claim 3, in which an encryptor is able to authorize and alternatively prohibit the encryption of a new cryptographic key, depending upon the value of the rewritable lock, without preventing the use of cryptographic keys already registered in the rewritable non-volatile memory, in response to a given EMM message for the registration of a new cryptographic key.

5. A security processor according to claim 1, in which the processor comprises a writer to toggle the value of the rewritable lock from the first value to the second value in response to an EMM message and prevent toggling of the value of the rewritable lock from the second value to the first value regardless of subsequent EMM messages received.

6. A security processor according to claim 1 in which the processor comprises a writer to toggle the value of the rewritable lock from the first value to the second value in response to an EMM message only if the current date present in the EMM message is earlier than an activation limiting date registered in the security processor.

7. A security processor according to claim 1, in which the security processor comprises a destructor for self-destruction of the security processor to render it permanently unusable with all the decoders available and in which a unit for the processing of ECM or EMM messages is able to compare the current date present in an ECM or EMM message received with an absolute expiry date placed in memory in the security processor and to automatically activate the destructor only if the current date is later than the absolute expiry date.

8. A register for the registration of access entitlements in a security processor according to claim 1 in response to an EMM message for the registration of new access entitlements, characterized in that the process comprises a stage of authorizing the registration of new access entitlements depending on the value of the rewritable lock, or alternatively a stage preventing it.

9. A register for the registration of new cryptographic keys in a security processor according to claim 3 in response to an EMM message for the registration of new cryptographic keys, characterised in that the process comprises a stage for authorizing this registration of new cryptographic keys, depending upon the value of the rewritable lock, and alternatively a stage of preventing it.

10. A security processor according to claim 3, in which the processor comprises a writer to toggle the value of the rewritable lock from the first value to the second value in response to an EMM message and prevent toggling of the value of the rewritable lock from the second value to the first value regardless of subsequent EMM messages received.

11. A security processor according to claim 3 in which the processor comprises a writer to toggle the value of the rewritable lock from the first value to the second value in response to an EMM message only if the current date present in the EMM message is earlier than an activation limiting date registered in the security processor.

12. A security processor according to claim 3, in which the processor comprises a destructor for self-destruction of the security processor to render it permanently unusable with all the decoders available and in which a unit for the processing of ECM or EMM messages is able to compare the current date present in an ECM or EMM message received with an absolute expiry date placed in memory in the security processor and to automatically activate the destructor only if the current date is later than the absolute expiry date.

13. A register for the registration of access entitlements in a security processor according to claim 5 in response to an EMM message for the registration of new access entitlements, characterized in that the process comprises a stage of authorizing the registration of new access entitlements depending on the value of the rewritable lock, or alternatively a stage preventing it.

14. A security processor according to claim 1, in which the processor comprises a plurality of rewritable locks, each of which have a value that can be toggled between at least a first and a second value in response to an EMM message, wherein some combinations of values of the respective rewritable locks are prohibited.

15. A security processor according to claim 3, in which the processor comprises a plurality of rewritable locks, each of which have a value that can be toggled between at least a first and a second value in response to an EMM message, wherein some combinations of values of the respective rewritable locks are prohibited.

* * * * *